(12) United States Patent
Porte et al.

(10) Patent No.: US 8,141,337 B2
(45) Date of Patent: Mar. 27, 2012

(54) DUAL FLOW TURBINE ENGINE EQUIPPED WITH A PRECOOLER

(75) Inventors: Alain Porte, Colomiers (FR); Damien Prat, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 932 days.

(21) Appl. No.: 12/160,181

(22) PCT Filed: Jan. 18, 2007

(86) PCT No.: PCT/FR2007/000090
§ 371 (c)(1),
(2), (4) Date: Jul. 7, 2008

(87) PCT Pub. No.: WO2007/083026
PCT Pub. Date: Jul. 26, 2007

(65) Prior Publication Data
US 2009/0000305 A1    Jan. 1, 2009

(30) Foreign Application Priority Data

Jan. 19, 2006 (FR) ...................................... 06 00472

(51) Int. Cl.
*F02K 3/02* (2006.01)

(52) U.S. Cl. ............................ 60/226.1; 60/266; 60/785

(58) Field of Classification Search ................. 60/39.83, 60/226.1, 266, 785
See application file for complete search history.

(56) References Cited

U.S. PATENT DOCUMENTS

| | | | |
|---|---|---|---|
| 3,842,597 A | | 10/1974 | Ehrich |
| 4,493,184 A | | 1/1985 | Nikkanen |
| 5,269,135 A | * | 12/1993 | Vermejan et al. ............ 60/226.1 |
| 5,729,969 A | * | 3/1998 | Porte ............................ 60/226.1 |
| 5,782,077 A | | 7/1998 | Porte |

FOREIGN PATENT DOCUMENTS

| | | |
|---|---|---|
| DE | 24 11 950 | 9/1974 |
| EP | 0 743 435 | 11/1996 |
| GB | 2 272 025 | 5/1994 |
| GB | 2 277 781 | 11/1994 |

OTHER PUBLICATIONS

International Search Report dated May 29, 2007 w/ English translation.
Written Opinion of the International Searching Authority with English translation.

* cited by examiner

*Primary Examiner* — Louis Casaregola
(74) *Attorney, Agent, or Firm* — Dickinson Wright PLLC

(57) ABSTRACT

A bypass turbine engine includes a precooler having an annular cross-sectional shape about the axis of a pod and arranged inside the rear part of an inner shroud in contact with a cold fluid exiting a fan duct.

8 Claims, 6 Drawing Sheets

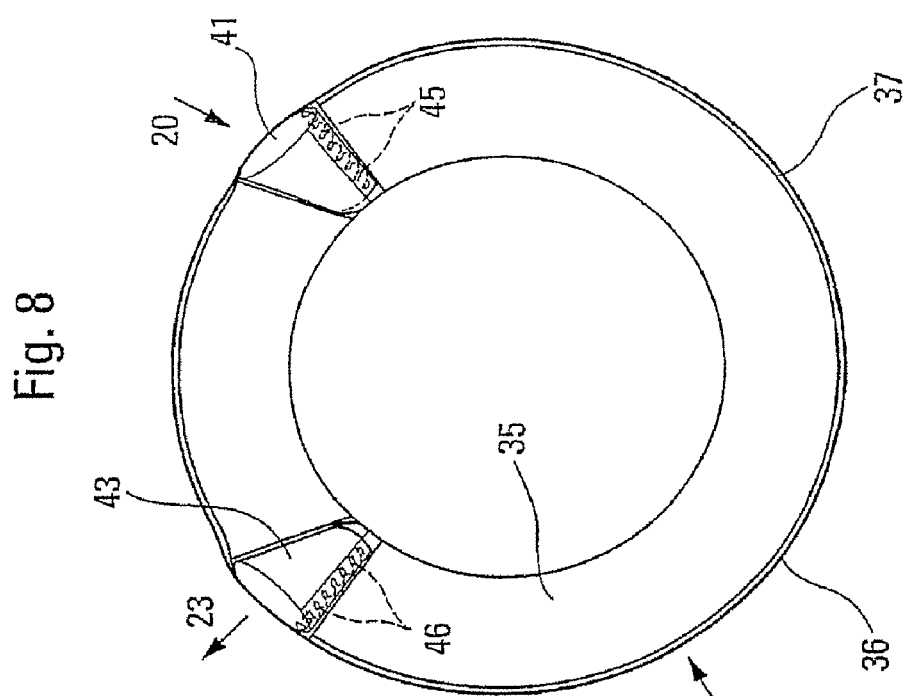
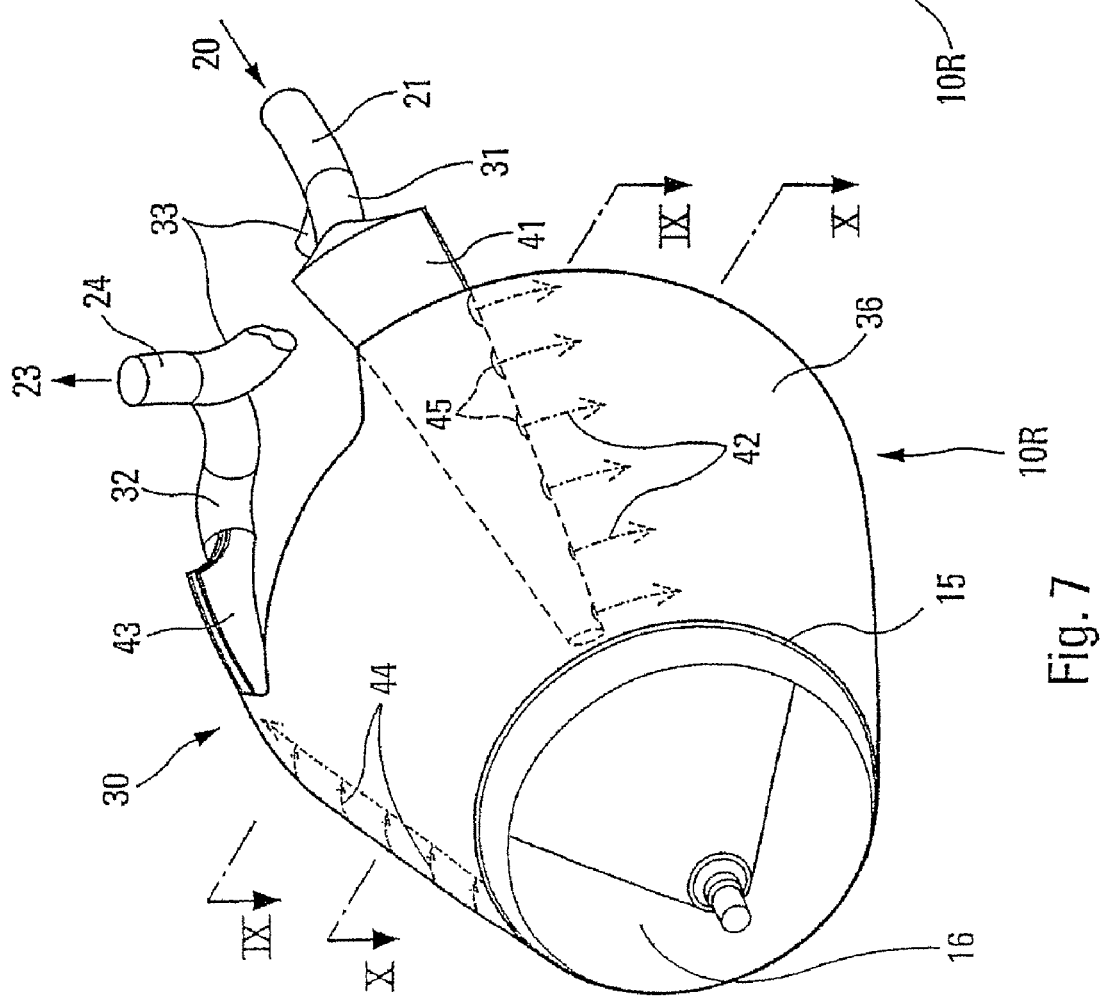

DUAL FLOW TURBINE ENGINE EQUIPPED WITH A PRECOOLER

FIELD OF THE INVENTION

The present invention relates to a bypass turbine engine provided with a precooler.

BACKGROUND OF THE INVENTION

It is known that, on board an aircraft, it is necessary to have hot air available to perform certain functions, such as air conditioning in the cockpit and the passenger cabin or for deicing certain parts of the aircraft.

It is also known that this hot air is taken from the turbine engines of the aircraft and has to be cooled significantly before it can be used. To do this, a heat exchanger is provided, this generally being known as a precooler, in which the hot air bled from the central generator of the turbojet engine is cooled by cold air bled from the fan duct, that is to say from the cold stream of the turbine engine, thus disrupting the correct operation of this engine. What is more, said precooler is generally housed in said fan duct, and this adds aerodynamic disturbances to the disruption caused by the tapping-off of cold air.

What is more, the cold air bled from the cold stream of the turbine engine and used to cool the hot stream bled from the central generator gives rise to a current of heated cold air, which has to be discharged to the outside of the turbine engine, thus increasing the drag of the aircraft.

SUMMARY OF THE INVENTION

It is an object of the present invention to remedy the disadvantages of the prior art.

To these ends, according to the invention, the bypass turbine engine for an aircraft comprising:
  a hollow nacelle of longitudinal axis provided, at the front, with an air inlet and, at the rear, with an air outlet;
  a central hot-stream generator, positioned axially in said nacelle;
  a fan positioned axially in said nacelle forward of said central generator and able to generate the cold stream for said turbine engine;
  an outer fairing borne internally by said nacelle and an inner fairing surrounding said central generator, said outer and inner fairings between them delimiting a fan duct of annular cross section for said cold stream; and
  a precooler comprising an inlet for a current of hot air bled from said central generator and an outlet for a current of hot air cooled using said cold stream,
is notable in that said precooler is positioned inside at least a portion of said rear part of the inner fairing around said longitudinal axis and in thermal contact with said rear part of the inner fairing so as to be cooled by said cold stream blown onto said rear part of the inner fairing.

Thus, by virtue of the present invention it is possible to avoid aerodynamic disturbances in the fan duct attributable to the precooler because the precooler is now housed in the rear part of said inner fairing. In addition, the disadvantages attributable to tapping air from the cold stream and discharging the heated cold air are avoided because said precooler can, without tapping or discharging, make direct use of the cold stream exiting the fan duct and which is blown onto said rear part of the inner fairing.

Thus the problems of the prior art are solved.

As a preference, in order to obtain a satisfactory area for heat exchange between the hot air flowing through said precooler and the cold stream blown thereonto, provision is made for said precooler to have a shape of annular cross section and extends over the entire internal periphery of said rear part of the inner fairing.

It is known that, in certain turbine engines, said inner fairing and said central generator between them delimit an intermediate chamber of annular cross section surrounding said central generator, said intermediate chamber being used to circulate a current of cold air able to regulate the temperature of said central generator. In this case, the embodiment of the present invention is particularly advantageous because said precooler is then positioned on the same side as said intermediate chamber.

In a preferred embodiment of the present invention, said inner fairing is, at least in its rear part, double walled, that is to say comprises an inner wall and an outer wall which are separated from one another by a space in the form of an annular gap, and said precooler is positioned in said space.

To these ends, said precooler may comprise:
  a distribution pipe, connected to said inlet for the current of hot air and able to distribute said hot air to at least approximately the entire length (parallel to the longitudinal axis of the nacelle) of said annular space; and
  a collection pipe connected to said outlet for the current of cooled hot air and able to collect said cooled hot air over at least approximately the entire length of said annular space.

As a preference, between said distribution pipe and said collection pipe (which pipes are positioned at the internal periphery of the rear part of the inner fairing in a way that is optimized for the cooling of the hot air), said precooler comprises a plurality of curved ducts for guiding the hot air, said ducts being transverse to the longitudinal axis of the nacelle and distributed over the length of said annular space.

Such ducts may advantageously be formed by a framework that reinforces the inner fairing, secured to said inner and outer walls thereof.

Advantageously, in order to provide even finer and easier regulation of the temperature of the cooled hot air, a duct is provided, preferably equipped with a controllable valve, mounted in parallel with said precooler and connecting its hot air inlet to its cooled hot air outlet.

BRIEF DESCRIPTION OF THE DRAWINGS

The figures of the attached drawing will make it easy to understand how the invention may be embodied. In these figures identical references denote elements that are similar.

FIG. 7 is an external view in perspective from the rear depicting said inner fairing.

FIG. 8 is an external view from the front of said inner fairing.

DETAILED DESCRIPTION OF THE INVENTION

Figure 1:
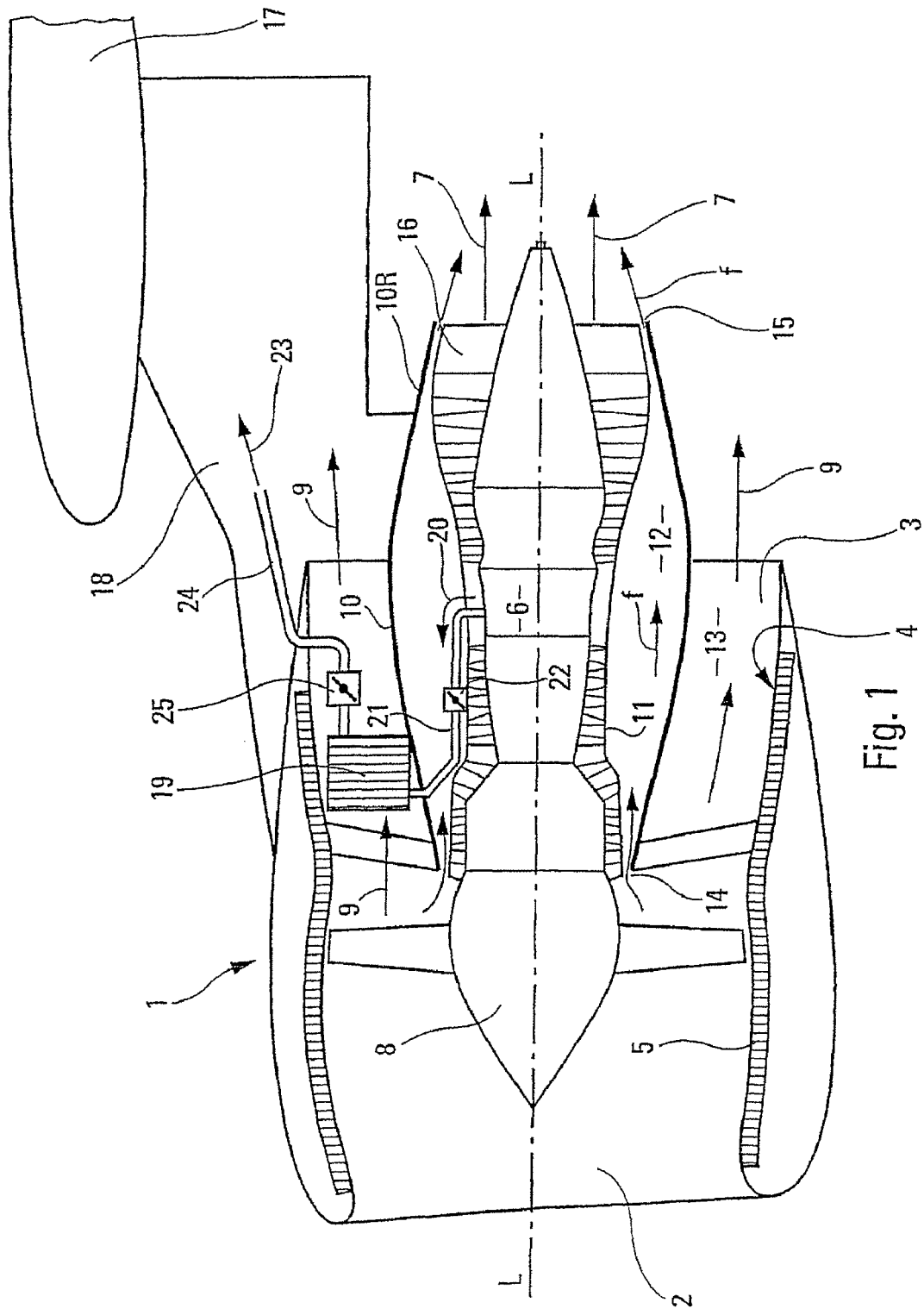
FIG. 1 illustrates, in schematic axial section, a known bypass turbine engine.
Figure 2:
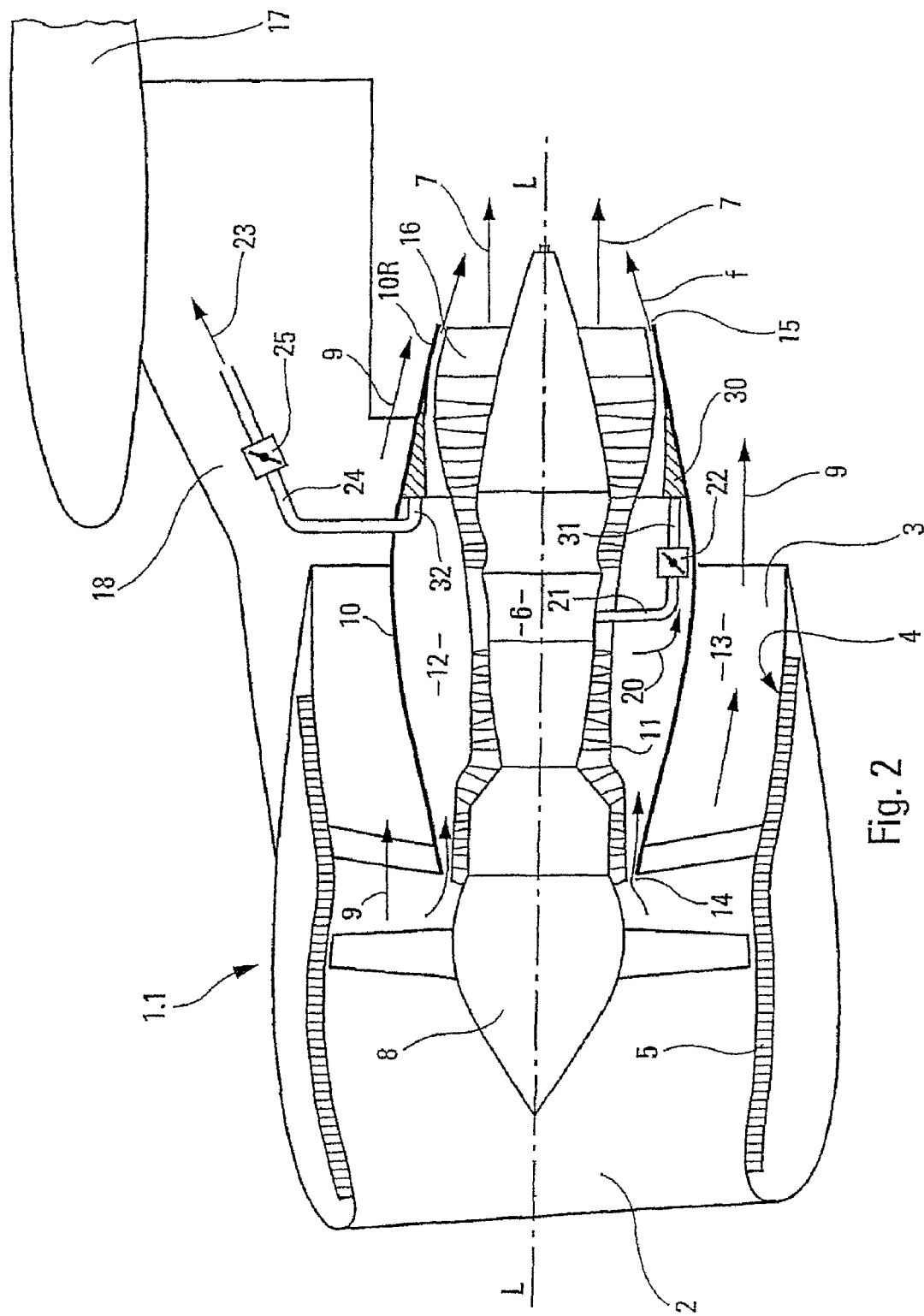
FIGS. 2 and 3 illustrate, in views similar to FIG. 1, two alternative forms of the turbine engine according to the present invention.
Figure 3:
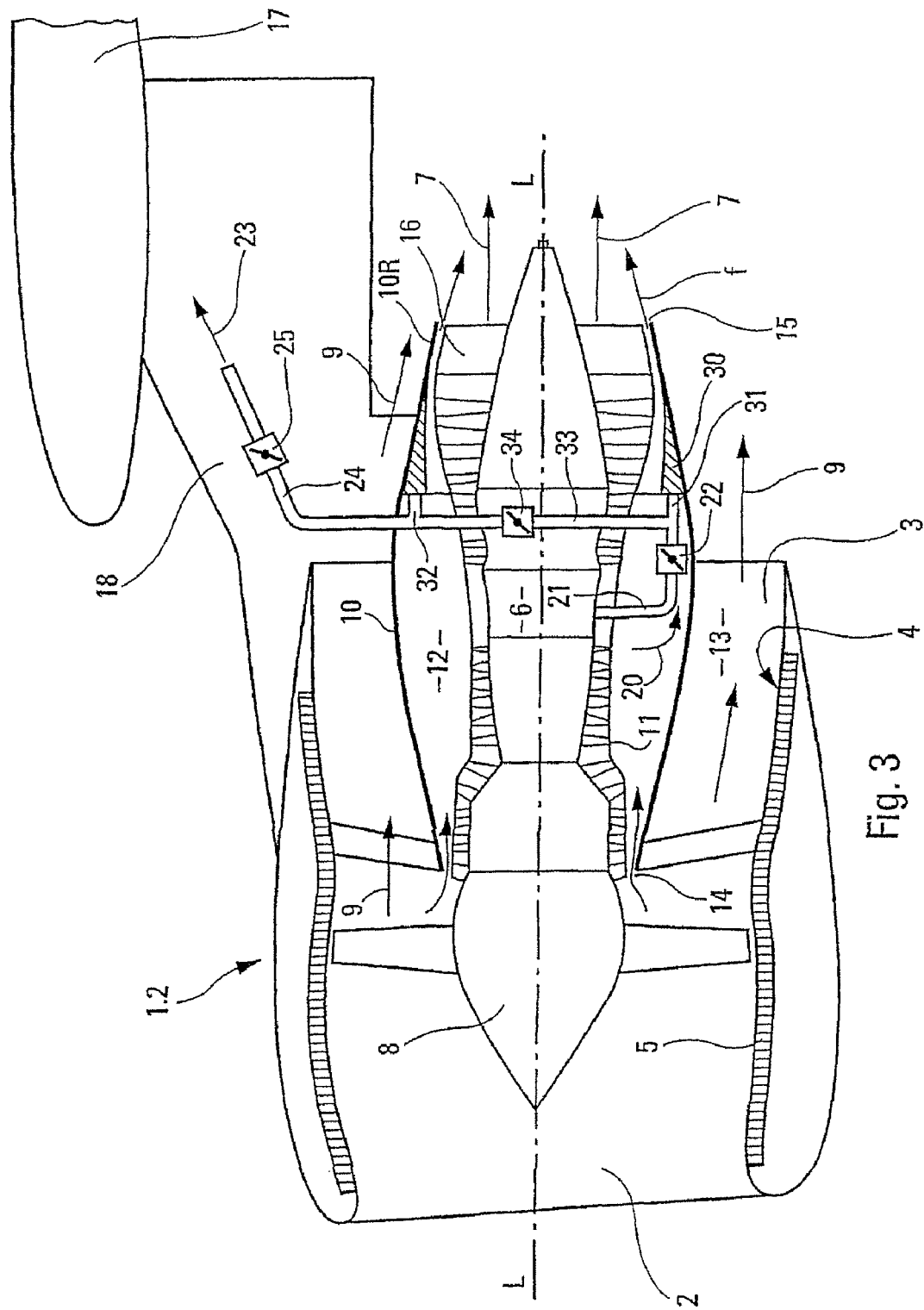

The bypass turbine engine shown by each of FIGS. 1, 2 and 3, comprises a hollow nacelle 1 of longitudinal axis L-L provided, at the front, with an air inlet 2, and, at the rear, with an air outlet 3. Said hollow nacelle 1 internally bears a fairing 4, preferably at least partially coated with acoustic attenuation coatings 5 intended to reduce the internal noise of said turbine engine.

Positioned inside the hollow nacelle 1 are:
- a central hot stream generator 6 comprising, in the known way, low-pressure and high-pressure compressors, a combustion chamber and low-pressure and high-pressure turbines, and generating the axial hot stream 7 of said turbine engine;
- a fan 8 positioned axially in front of said central generator 6 and generating the annular cold stream 9 of said turbine engine; and
- an inner fairing 10 surrounding said central generator 6 and forming, between itself and the casing 11 of this generator, an intermediate chamber 12 of annular cross section surrounding said generator, the rear part 10R of said fairing forming the outer wall of the jet pipe 16 for said hot stream 7.

The inner fairing 10 and the fairing 4, external to it, between them form a fan duct 13 of annular cross section surrounding the central generator 6 and through which the cold stream 9 flows.

Formed between the inner fairing 10 and the central generator 6 are, at the front, an annular air intake slot 14, and, at the rear, an annular air discharge slot 15. Thus, the intermediate chamber 12 can be swept by a current of cold air f bled from the cold stream 9 at the front slot 14 and discharged at the boundary between said hot stream 7 and said cold stream 9 at the rear slot 15, this current of cold air f being used to regulate the temperature of the central generator 6.

Furthermore, in the usual way, the nacelle 1 is supported by a wing 17 of the aircraft (this wing is depicted in part) via a suspension pylon 18.

In the known turbine engine illustrated in FIG. 1, a precooler 19 is provided, this being positioned in the upper part of the fan duct 13 in the cold stream 9. This precooler 19 is fed with a current of hot air 20, from the central generator 6, via a duct 21 on which there is a hot air regulating valve 22. The cooled hot air 23 generated by the precooler 19 is dispatched to the user equipment (not depicted) via a duct 24 which passes through the suspension pylon 18 and which may be fitted with a regulating valve 25.

Thus, in this known layout, some of the cold stream is bled off by the precooler 19 to cool the current of hot air 20 and to generate the cooled hot air current 23 and this also results in said precooler forming a current of heated cold air (not depicted) corresponding to said bled-off portion of the cold stream. This current of heated cold air is discharged to the outside, in any known way not depicted in FIG. 1, and generally causes an increase in drag.

It will be readily understood therefore that the presence of the precooler 19 in the fan duct 13, the bleeding-off of some of the cold stream 9 and the discharging of the heated cold air are detrimental to the performance of the known engine illustrated in FIG. 1.

In the nacelle 1.1, according to the present invention and depicted in FIG. 2, we find all of the elements 2 to 18 and 20 to 25 described with reference to FIG. 1. In this nacelle 1.1, the precooler 19 has been eliminated and replaced by the precooler 30 which has an inlet 31 connected to the duct 21 supplying the hot air current 20 and an outlet 32 connected to the duct 24 carrying the cooled hot air 23.

The precooler 30 has an annular cross section and is positioned inside said rear part 10R of the inner fairing 10, on the same side as the intermediate chamber 12 and extends over the entire internal periphery of said rear part. It is coaxial with the axis L-L and is in thermal contact with said rear part 10R. Because this rear part is in contact with the cold stream 9 exiting the fan duct 13, said precooler 30 is itself cooled by the cold stream 9 without in any way having to bleed off some of the air or having to discharge cooled hot air.

FIG. 3, which shows all the elements of FIG. 2, additionally shows the existence, in the nacelle 1.2 according to the invention of a bypass duct 33 mounted in parallel with the precooler 30, connecting its inlet 31 and its outlet 32 and provided with a valve 34. Thus, if necessary, hot air can be routed directly from the inlet 31 to the outlet 32, thereby bypassing the precooler 30.

The exemplary embodiment of the precooler 30 which is illustrated by FIGS. 4 to 10 is structurally incorporated into said rear part 10R of the inner fairing 10.

Figure 4:
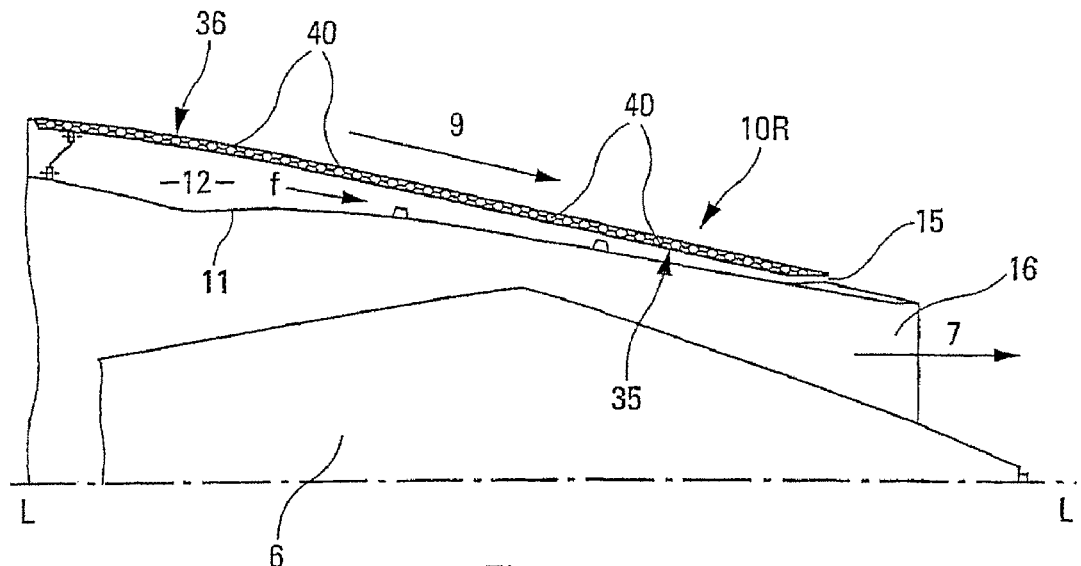
FIG. 4 illustrates, in schematic longitudinal half section, the inner fairing surrounding the hot stream of the engines of FIGS. 2 and 3.
Figures 5, 6:
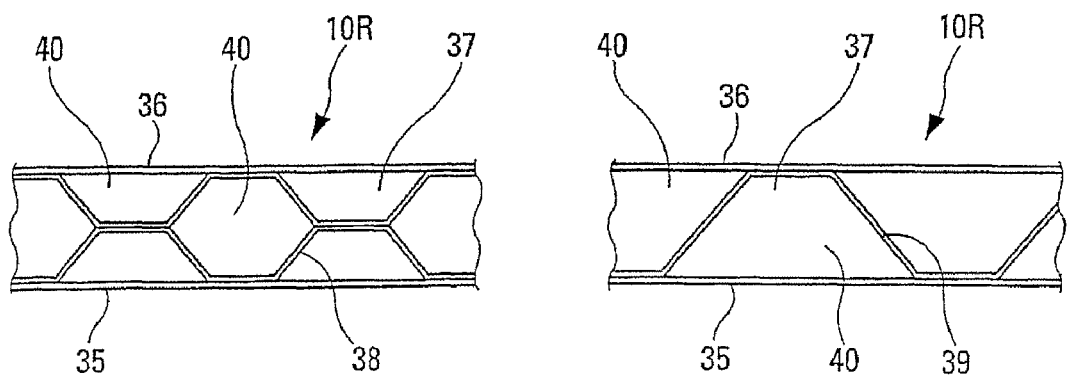
FIGS. 5 and 6 illustrate, on a larger scale, the structure of the fairing of FIG. 4.
Figure 9:
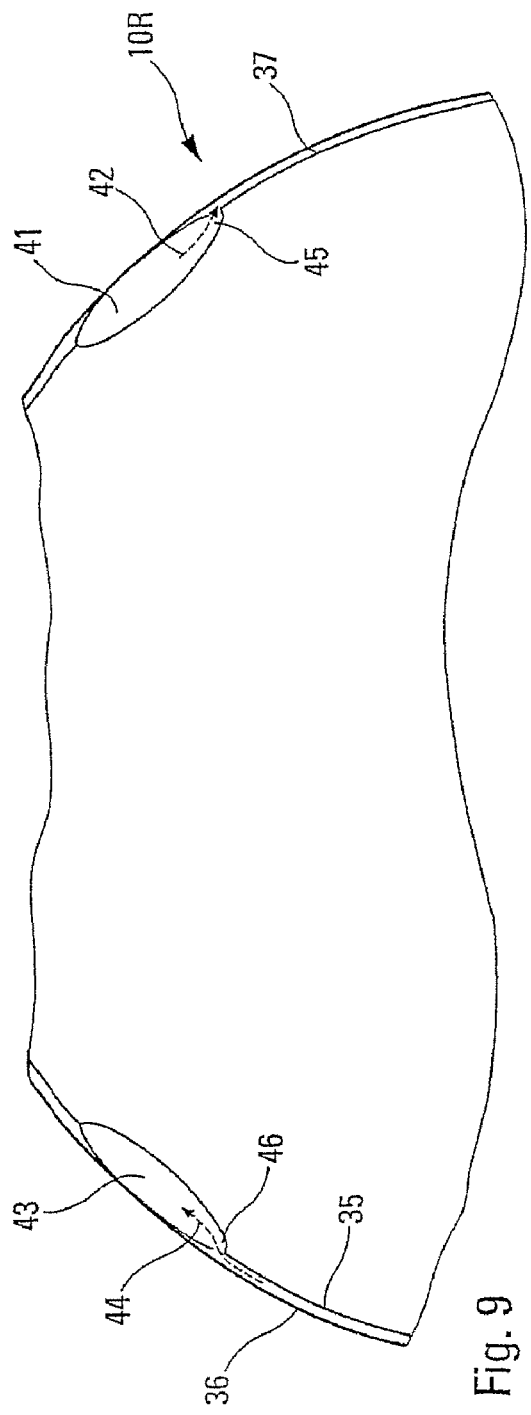
FIGS. 9 and 10 are partial cross sections on IX-IX and X-X of FIG. 7, respectively.
Figure 10:
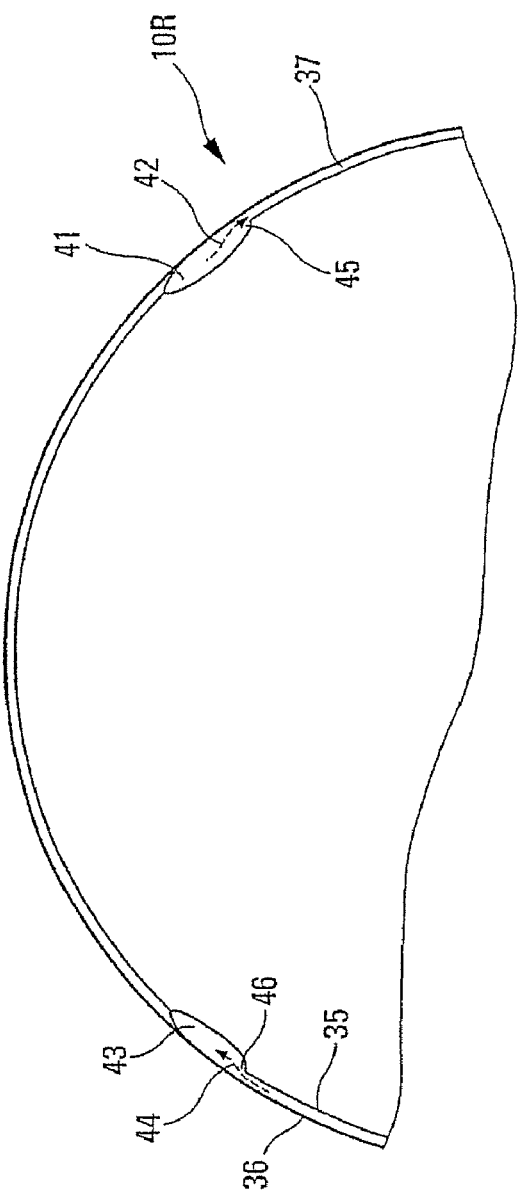

As can be seen in FIGS. 4 to 6, said rear part 10R comprises an inner wall 35 and an outer wall 36 which are parallel and spaced apart from one another by a space 37 in the form of an annular gap. Positioned in this space is a framework 38 (FIG. 5) or 39 (FIG. 6) secured to said inner and outer walls 35 and 36 and delimiting curved ducts 40 which subdivide the space 37. The ducts 40 are transverse to the axis L-L of the nacelle and are distributed along said rear part 10R.

Furthermore, said precooler 30 comprises (see FIG. 7):
- a distribution pipe 41 connected to the hot air inlet 31 and able to distribute said hot air (see arrows 42) within said space 37 (and therefore into the ducts 40) along the entire rear part 10R and transversely thereto; and
- a collection pipe 43 connected to the cooled hot air outlet 32 and able to collect said air (see arrows 44) passing through said space 37 through the ducts 40, along the length of the rear part 10R.

As illustrated in FIGS. 7 to 10, the cross section of the pipes 41 and 43 decreases from the front rearward, while the reverse is true of the distribution orifices 45 and the collection orifices 46 with which they are respectively provided.

The invention claimed is:
1. A bypass turbine engine for an aircraft, said turbine engine comprising:
   - a hollow nacelle having a longitudinal axis an air inlet at a front portion of the hollow nacelle and an air outlet at a rear portion of the hollow nacelle;
   - a central hot-stream generator, positioned axially in said nacelle;
   - a fan, which generates a cold stream flow, positioned axially in said nacelle and forward of said central hot-stream generator;
   - an outer fairing and an inner fairing internal to said nacelle, wherein said an inner fairing surrounds said central hot-stream generator, and said outer and inner fairings are positioned so as to define between the outer and inner fairings a fan duct of annular cross section for said cold stream flow, with said inner fairing and said central hot-stream generator being positioned so as to define an intermediate chamber of annular cross section that surrounds the central hot-stream generator internal to said inner fairing for said cold stream flow, with said inner fairing having a rear part at the rear portion of the hollow nacelle; and a precooler comprising an inlet for a current of hot air bled from said central hot-stream generator and an outlet for a current of hot air cooled from said cold stream flow, wherein said precooler is positioned inside at least a portion of said rear part of the inner fairing around said longitudinal axis, and in the intermediate chamber so as to be in thermal contact with and cooled by said cold stream flow through the intermediate chamber.

2. The turbine engine as claimed in claim 1, wherein said precooler has a shape of annular cross section and extends over an entire periphery of said rear part of the inner fairing.

3. The turbine engine as claimed in claim 1, wherein, said inner fairing comprises an inner wall and an outer wall which are parallel and separated from one another by an annular gap, and said precooler is positioned in said annular gap.

4. The turbine engine as claimed in claim 3, further comprising:
   a distribution pipe, connected to said inlet for the current of hot air and positioned to distribute said current of hot air to at least a length of said annular gap; and
   a collection pipe connected to said outlet for the current of cooled hot air and positioned to collect said cooled hot air over at least a length of said annular gap.

5. The turbine engine as claimed in claim 4, wherein, between said distribution pipe and said collection pipe, said precooler comprises a plurality of curved ducts for guiding the current of hot air, said ducts being transverse to the longitudinal axis of the nacelle and distributed over the length of said annular gap.

6. The turbine engine as claimed in claim 5, wherein said ducts are formed by a framework reinforcing said rear part of the inner fairing and secured to said inner and outer walls.

7. The turbine engine as claimed in claim 1, further comprising a bypass duct mounted in parallel with said precooler and connecting said inlet for the current of hot air and said outlet for the current of cooled hot air.

8. The turbine engine as claimed in claim 7, wherein said bypass duct comprises a controllable valve.

* * * * *